United States Patent
Kobayashi et al.

(10) Patent No.: US 7,012,668 B2
(45) Date of Patent: Mar. 14, 2006

(54) METHOD OF MEASURING AC RESIDUAL IMAGE IN A LIQUID CRYSTAL DISPLAY DEVICE

(75) Inventors: Setsuo Kobayashi, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/129,384

(22) Filed: May 16, 2005

(65) Prior Publication Data
US 2005/0200795 A1    Sep. 15, 2005

Related U.S. Application Data

(63) Continuation of application No. 09/889,788, filed on Sep. 26, 2001, now abandoned.

(60) Provisional application No. PCT/JP99/00244, filed on Jan. 22, 1999.

(51) Int. Cl.
*G02F 1/13* (2006.01)

(52) U.S. Cl. ...................... 349/187; 324/770
(58) Field of Classification Search .............. None
See application file for complete search history.

(56) References Cited

U.S. PATENT DOCUMENTS

| | | | | |
|---|---|---|---|---|
| 5,264,953 A | * | 11/1993 | Hirai et al. | 349/33 |
| 5,350,539 A | * | 9/1994 | Mishina et al. | 252/299.4 |
| 5,600,464 A | * | 2/1997 | Ohe et al. | 349/123 |
| 5,831,707 A | * | 11/1998 | Ota et al. | 349/141 |
| 5,933,202 A | * | 8/1999 | Watanabe et al. | 349/33 |
| 5,936,689 A | * | 8/1999 | Saishu et al. | 349/123 |
| 6,066,696 A | * | 5/2000 | Yu et al. | 525/178 |
| 6,300,994 B1 | * | 10/2001 | Ohe et al. | 349/141 |
| 6,590,411 B1 | * | 7/2003 | Lee | 324/770 |

FOREIGN PATENT DOCUMENTS

JP    10-39306    2/1998

* cited by examiner

*Primary Examiner*—Frank G. Font
*Assistant Examiner*—Timothy Rude
(74) *Attorney, Agent, or Firm*—Antonelli, Terry, Stout and Kraus, LLP.

(57) ABSTRACT

A pair of substrates and a liquid crystal layer held between the pair of substrates are provided, at least one of the pair of substrates has plural electrodes for applying an electric field approximately parallel to the substrate to the liquid crystal layer, a protecting film for protecting at least one of the plural electrodes and oriented films or the electrodes, and an AC residual image of the oriented film is less than 8% to thereby enable high quality image display upon eliminating display defects caused by the AC residual image.

8 Claims, 6 Drawing Sheets

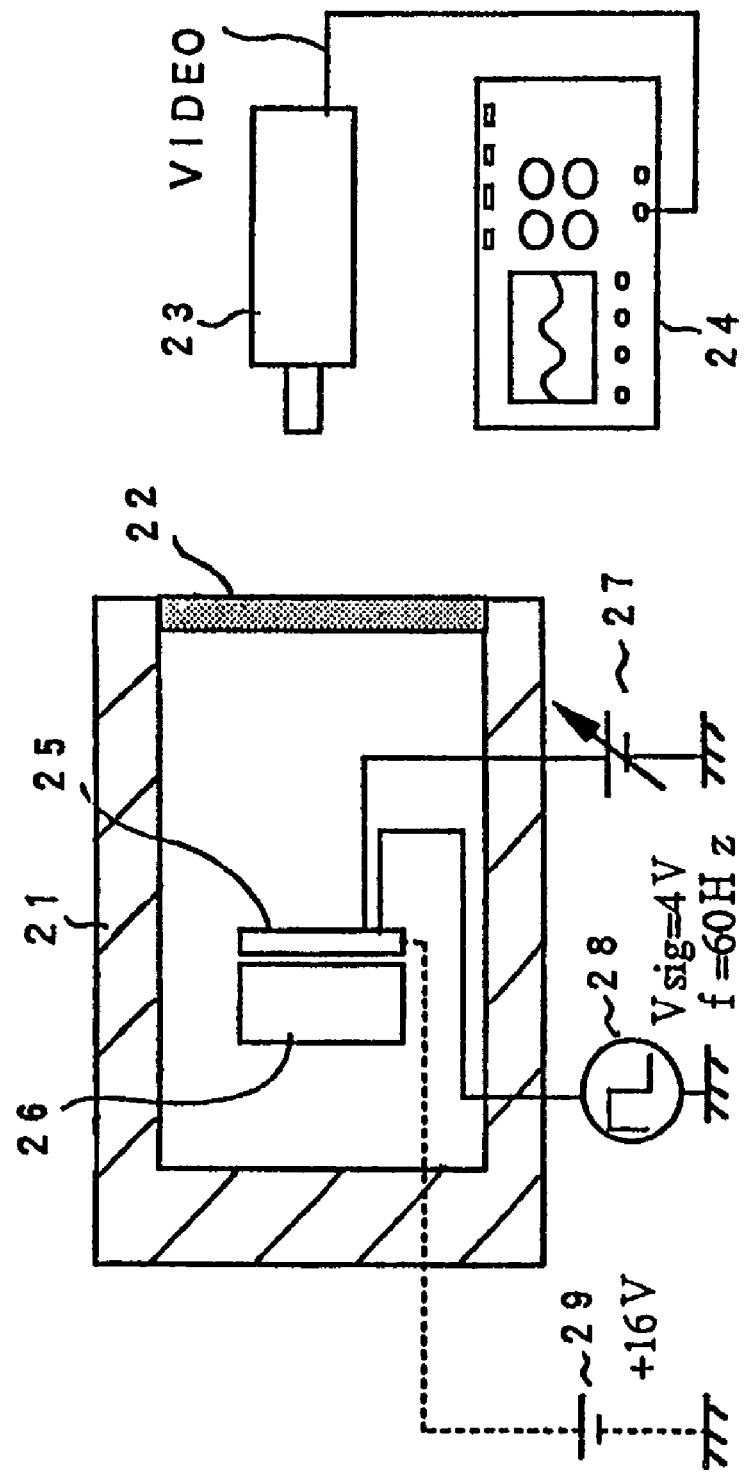

FIG. 6(a)
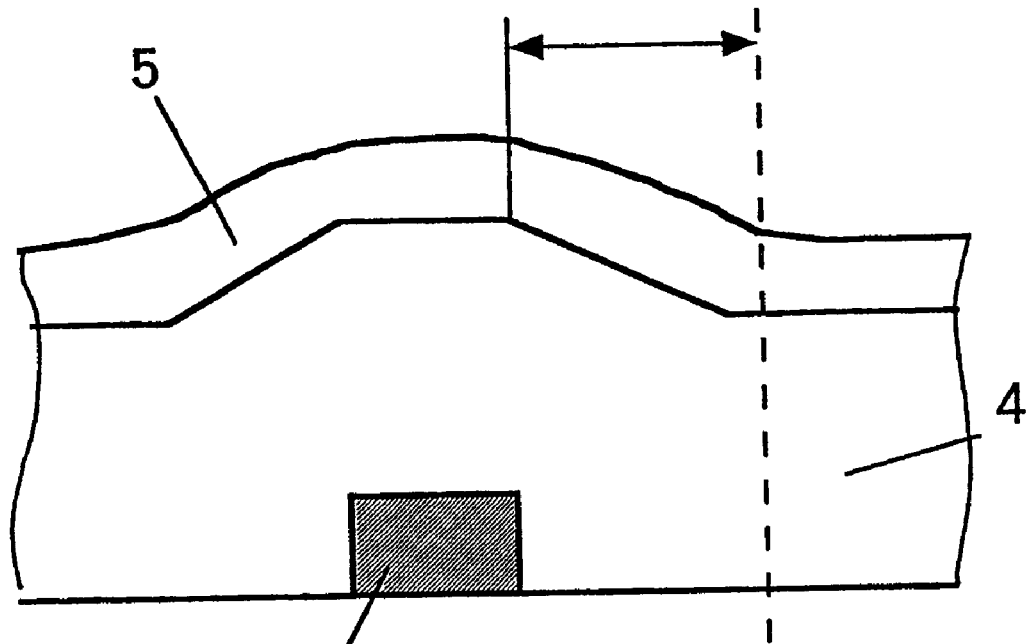
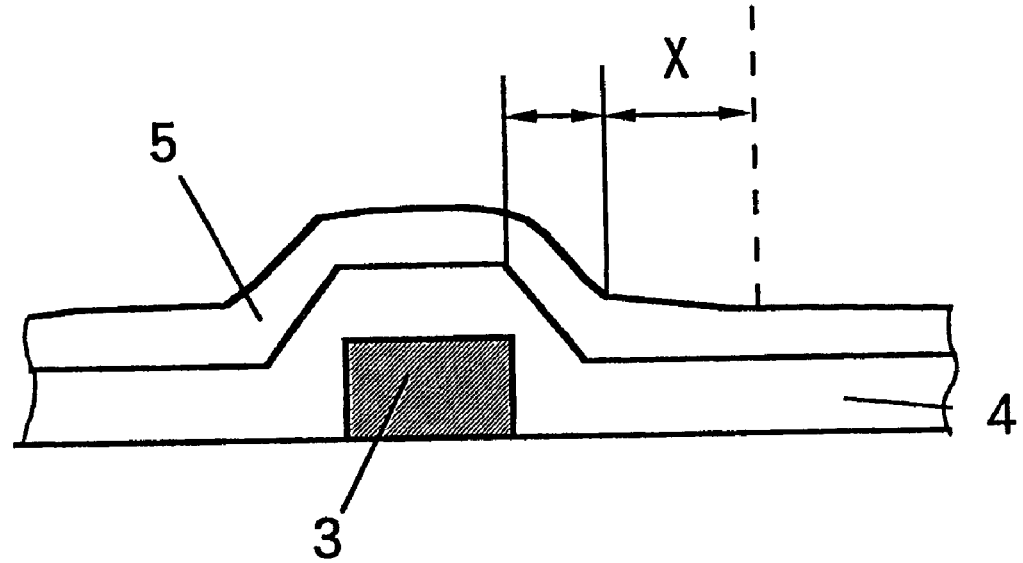
FIG. 6(b)

METHOD OF MEASURING AC RESIDUAL IMAGE IN A LIQUID CRYSTAL DISPLAY DEVICE

This application is a continuation of application Ser. No. 09/889,788 filed 20 Jul. 2001 now abandoned [371(c) date 26 Sep. 2001] which us a 371 of PCT/JP99/00244 filed 22 Jan. 1999.

TECHNICAL FIELD

The present invention relates to a liquid crystal display device in which an electric field is applied in a direction approximately parallel to flat surfaces of substrates to drive a liquid crystal. It is particularly effective for application to a liquid crystal display device in which a residual image caused by pure AC driving is reduced, excellent display characteristics are provided and a productivity is excellent.

BACKGROUND OF THE INVENTION

In an ordinary liquid crystal display device, a longitudinal electric field system typified by a twisted nematic display system in which an electrode driving a liquid crystal layer held between a pair of substrates is constructed of a transparent electrode formed opposite to each of the pair of substrates and an electric field provided in a direction approximately vertical to the surfaces of the substrates is applied to drive a liquid crystal was employed.

On the other hand, a lateral electric field system in which an electric field applied to a liquid crystal is provided in a direction approximately parallel to surfaces of substrates was developed. As an example of this system, the use of a pair of comb-like electrodes in which an electrode providing an electric field approximately in parallel with the surfaces of the electrodes is formed on one of the substrates is disclosed in, for example, Japanese Patent Publication No. 21,907/1988, U.S. Patent Specification No. 4,345,249, European Patent No. 91/10,936, Japanese Patent Laid-Open Nos. 222,397/1994 and 160,878/1994, and the like. It is unnecessary that the electrodes disclosed in these documents are transparent, and opaque metal electrodes having a high conductivity are used.

In the display system in which the direction of the electric field applied to the liquid crystal is a direction approximately parallel to the surfaces of the substrates as disclosed in the above-mentioned documents, a method for reducing display unevenness present from the outset, such as an edge domain has been proposed to date in Japanese Patent Laid-Open No. 159,786/1995. However, a construction or the like which is required for eliminating display unevenness occurring in a stress test such as a high-temperature working test or the like and improving a productivity is not described at all.

Applicant of the present application has found, with respect to the foregoing liquid crystal display device of the lateral electric field system, that usual AC driving is conducted at a high temperature of 55 DEG C. or the like to form a residual image (this is referred to as an AC residual image) which leads to a display defect.

For eliminating this display unevenness, Applicant of the application has made assiduous effort, and has consequently confirmed that it is not observed so long as the AC residual image is below a certain percentage. And, it has been found that for coping with the display defect caused by the display unevenness, it is effective to use a specific oriented film and increase an interaction between the oriented film and the liquid crystal molecules.

It has been moreover found that a silane coupling agent in the oriented film which is ordinarily used to improve an adhesion with substrates influences the display unevenness.

The invention aims to provide a liquid crystal display device that enables high-quality image display upon eliminating the display defect caused by the AC residual image.

SUMMARY OF THE INVENTION

The invention is characterized by the construction described in the following (1) to (6).

(1) A liquid crystal display device comprising a pair of substrates and a liquid crystal layer held between the pair of substrates, at least one of the pair of substrates being provided with plural electrodes for applying an electric field to the liquid crystal layer, a protecting film for protecting at least one of the plural electrodes and oriented films formed to cover the protecting film or the electrodes, in which the film thickness of the protecting film is in the range of from 0.1 mu m to 0.7 mu m, and an AC residual image of the oriented films is less than 8%.

(2) A specific resistance of the liquid crystal layer is 10<10> OMEGA .cm or more.

(3) At least one of the oriented films in (1) or (2) is an organic polymer containing at least one of a polymer and an oligomer in which a weight substance with a long-chain alkyl group applied to an amine component or an acid sentence is at least 5% and at most 30% of the total molar amount.

(4) A weight average molecular weight of the polymer and the oligomer in (3) is at least 2,000 and at most 30,000.

(5) The polymer and the oligomer in (3) or (4) contain a long-chain alkylene group of at least one of a main chain type and a terminal type.

(6) The oriented film in (1) to (5) is an organic polymer of a polymer and/or oligomer amic acid imide type, a polymer and/or oligomer amide-imide type, a polymer and/or oligomer imidosiloxane type or a polymer and/or oligomer amide-imide type containing a long-chain alkylene group.

(7) A liquid crystal display device comprising a pair of substrates and a liquid crystal layer held between the pair of substrates, at least one of the pair of substrates being provided with at least a pair of electrodes for applying an electric field to the liquid crystal layer, protecting films for protecting the plural electrodes and oriented films formed on the protecting films and the electrodes, in which the film thickness of the protecting films is less than 0.5 mu m, and an AC residual image of the oriented films is less than 8%.

BRIEF DESCRIPTION OF THE DRAWINGS

FIG. 5 is a block diagram of a measurement system for evaluating change in B-V characteristics; and FIG. 6 is a sectional view of an overlapped portion of a pixel electrode and a passivation film.

DETAILED DESCRIPTION OF THE PREFERRED EMBODIMENTS

Figure 1:
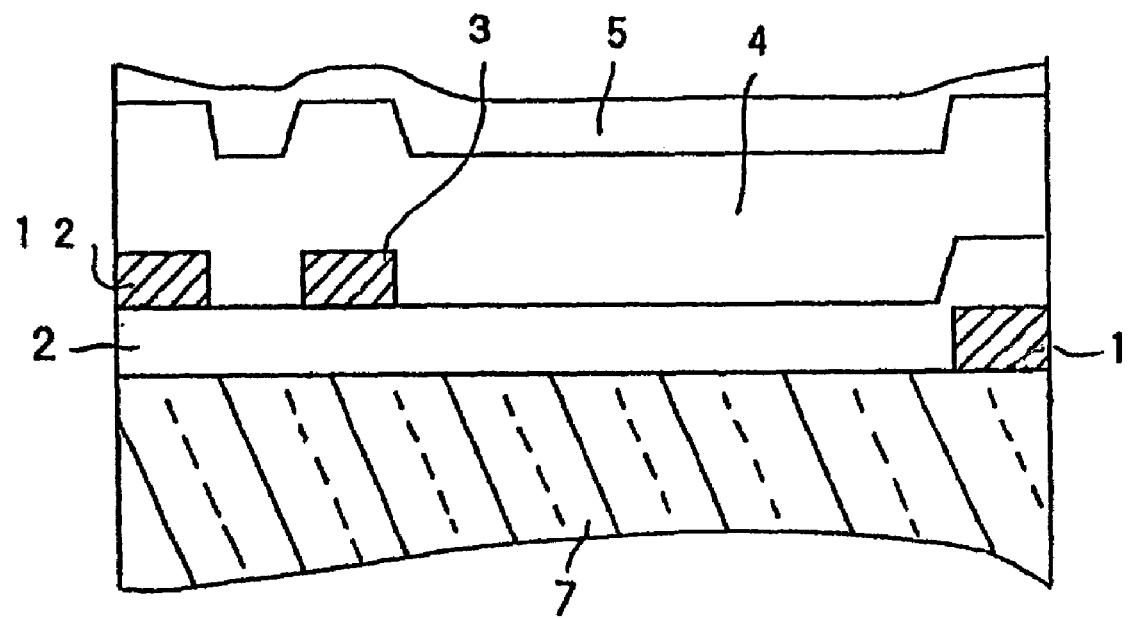
FIG. 1 is a schematic sectional view showing a simplified structure of one substrate, which describes a first working example of a liquid crystal display device according to the invention.

The invention is described in more detail below by referring to the drawings attached. In the invention, the scope of claims of the invention is not limited to the following Examples.

EXAMPLE 1

FIG. 1 is a schematic sectional view showing a simplified structure of one substrate, which describes the first working example of the liquid crystal display device according to the invention.

The substrate shown is a substrate on which electrodes are formed in a liquid crystal display device of a lateral electric field system. Element 1 is a common electrode, 2 a gate insulation film, 3 a pixel electrode, 4 a passivation film (insulation film), 5 an oriented film, 7 a glass substrate constituting a substrate on which electrodes are formed, 11 a thin film transistor, and 12 a picture signal electrode.

Figure 2:
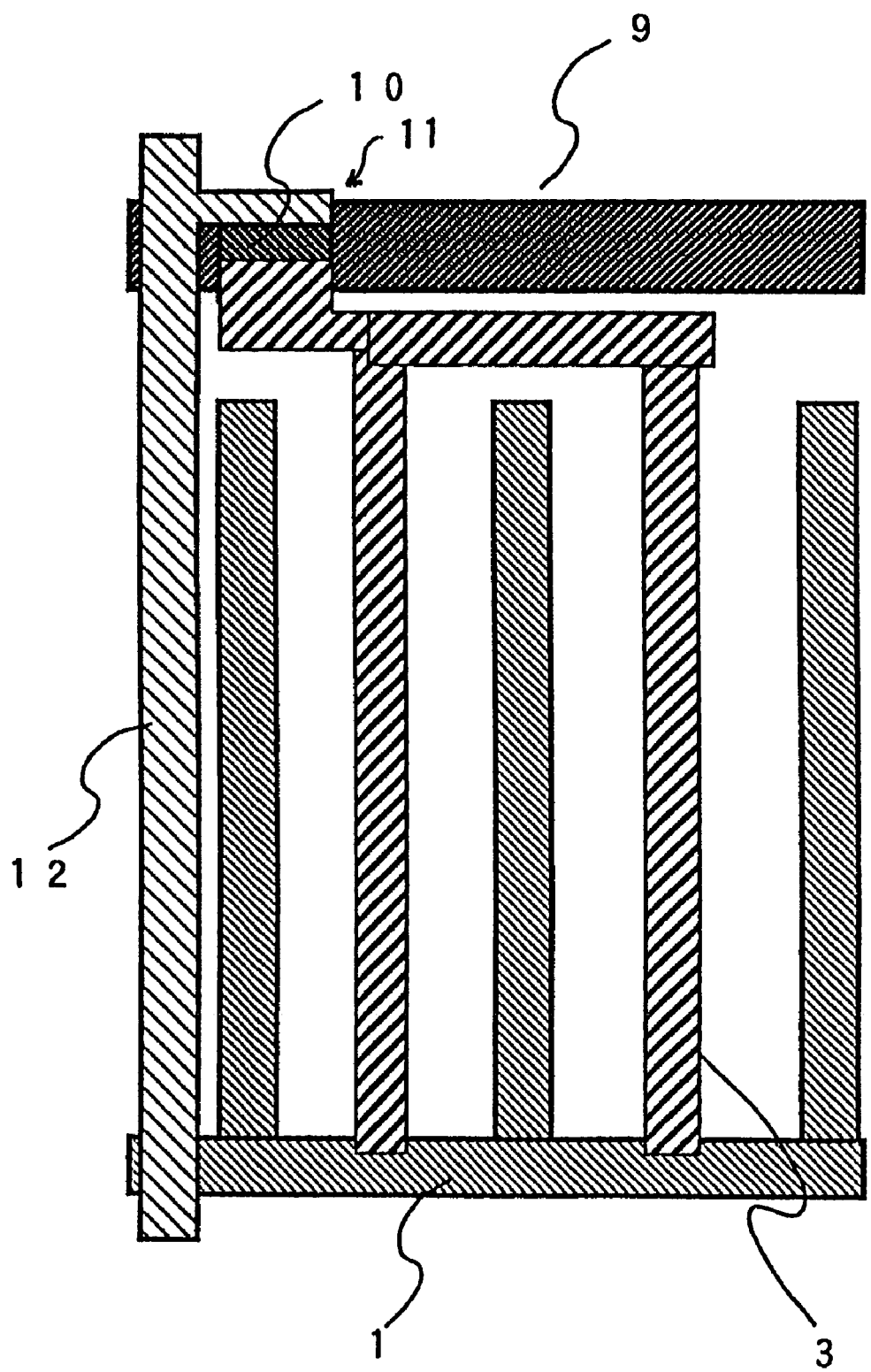
FIG. 2 is a schematic plan view showing a construction of various electrodes in a unit pixel, which describes the first working example of the liquid crystal display device according to the invention.

Further, FIG. 2 is a schematic plan view showing a construction of various electrodes in a unit pixel, which describes the first working example of the liquid crystal display device according to the invention. 9 is a scanning signal electrode, and 10 amorphous Si.

The scanning signal electrode 9 and the common electrode 1 are formed on a glass substrate 7 polished, and the surfaces of the scanning signal electrode 9 and the common electrode 1 are coated with an alumina film which is an anode oxide film of aluminum Al.

A gate insulation film 2 made of a silicon nitride SiN film and an amorphous silicon a-Si film 10 are formed to cover the scanning signal electrode 9 and the common electrode 1, and the n-type a-Si film, the pixel electrode 3 and the picture signal electrode 12 are formed on this a-Si film 10.

A laminated electrode using chromium Cr in an undercoat layer and aluminum Al in an upper layer is used as the pixel electrode 3 and the picture signal electrode 12. The film thickness is 0.2 mu m in total.

The materials of the scanning signal electrode 9, the common electrode 1, the pixel electrode 3 and the picture signal electrode 12 are not limited to the foregoing materials, and they are not limited so long as they are metallic materials having a low electric resistance. For example, a metal such as chromium, aluminum, copper, niobium or the like, an alloy such as CrMo, AlTiTa or the like, or a laminated structure using aluminum in an undercoat layer and chromium in an upper layer is also available.

The pixel electrode 3 and the picture signal electrode 12 have, as shown in FIG. 2, a structure that both are parallel to the striped common electrode 1 and intersect the scanning signal electrode 9, and a transistor element (thin film transistor TFT) 11 and a metal electrode group are formed on one substrate.

Consequently, an electric field provided between the pixel electrode 3 and the common electrode 1 on one substrate is formed approximately in parallel with the surface of the substrate.

The electrode arrangement is not limited to that shown in FIG. 2. A structure for making the driving direction of the liquid crystal bidirectional in the pixel, for example, a structure that the common electrode 1 and the pixel electrode 3 are in zigzag fashion or a structure that the common electrode 1 and the pixel electrode 3 are not parallel to the picture signal electrode 12 is also available.

The number of pixels is 1,024(×3)×768, and the pixel pitch is 88 mu m in a lateral direction (namely, between common electrodes) and 264 mu m in a longitudinal direction (namely, between scanning signal electrodes). Further, a substrate (not shown) opposite to the substrate having the transistor element is provided thereon with a striped color filter of R, G and B three colors.

A transparent resin for flattening a surface is laminated on this color filter. An epoxy resin is used as a material of the transparent resin. Further, a polyimide-based oriented film is coated on the transparent resin.

Figure 3:
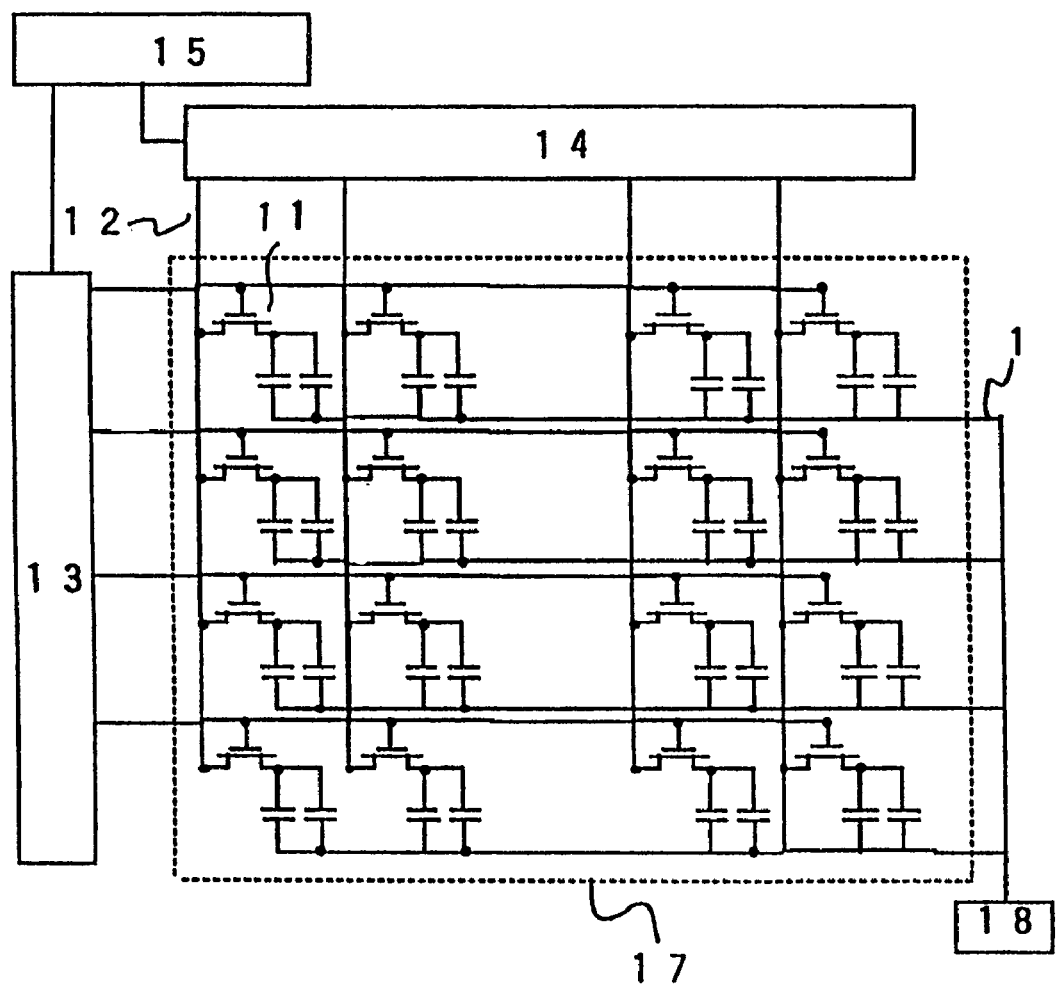
FIG. 3 is an equivalent circuit diagram describing a driving structure of the first working example of the liquid crystal display device according to the invention.

FIG. 3 is an equivalent circuit diagram describing a driving structure of the first working example of the liquid crystal display device according to the invention. Element 13 is a vertical scanning circuit, 14 a picture signal driving circuit, 15 a power supply circuit/controller, 17 a display section (liquid crystal panel), and 18 a common electrode driving circuit.

Driving LSI is connected with the display section 17, the vertical scanning circuit 13 and the picture signal driving circuit 14 are connected therewith, and a scanning signal voltage, a picture signal voltage, a timing signal and the like are supplied from the power supply circuit/controller 15 to conduct image display.

Figure 4:
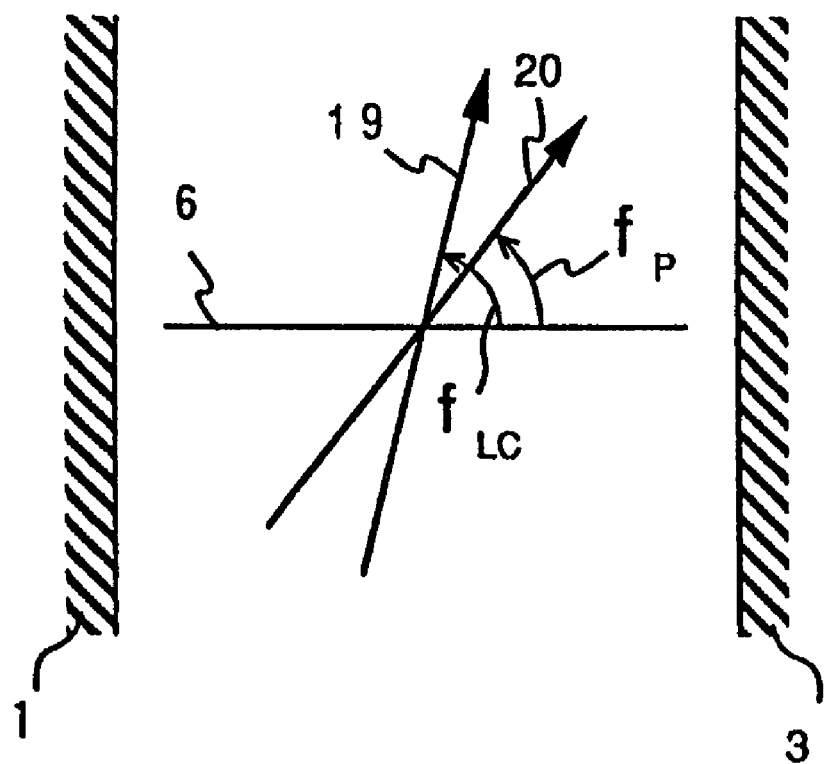
FIG. 4 is a descriptive view of a rubbing angle and an angle of a deflection plate in the liquid crystal display device according to the invention.

FIG. 4 is a descriptive view of a rubbing angle and an angle of a deflection plate in the liquid crystal display device according to the invention. Element 6 is a direction of an electric field, 19 a rubbing direction, and 20 a transmission axis of the deflection plate.

In the same figure, the rubbing directions 19 of the oriented films formed on the upper and lower substrates (a substrate on which the color filter is formed and a substrate on which the electrodes are formed) are approximately parallel to each other, and an angle fLC with the direction 6 of the electric field to be applied is 75 DEG.

Two deflection plates (for example, G1220DU, trade name of a product made by Nitto Denko K.K.) are mounted above and below the liquid crystal panel. The deflected light transmission axis of one deflection plate is approximately parallel to the rubbing direction 19, namely 75 DEG, and the deflected light transmission axis of another deflection plate is approximately orthogonal (−15 DEG) to the rubbing direction 19. Normally close characteristics were thereby obtained.

A liquid crystal containing a compound having three fluoro groups in its terminal as a main component and having a positive dielectric anisotropy DELTA epsilon is held between the substrates. SiN is used in the passivation film 4, and its film thickness is in the range of from 0.1 to 0.7 mu m. That is, the present inventors have found that by reducing the film thickness of the passivation film, the flat region of the oriented film is increased as shown in FIG. 6 to reduce the AC residual image of the oriented film.

FIG. 6(*a*) is a sectional view of an overlapped portion of the pixel electrode 3 and the passivation film 4 when the film thickness of the passivation film 4 is great enough. FIG. 6(*b*) is a sectional view of an overlapped portion of the pixel electrode 3 and the passivation film 4 when the film thickness of the passivation film 4 is in the range of from 0.1 to 0.7 mu m.

Since the film thickness of the passivation film 4 is small in FIG. 6(*b*), the oriented film 5 is, as shown, flattened by X as compared with FIG. 6(*a*).

An orientation controlling force of the oriented film 5 is generated by so-called rubbing treatment. The flattening results in increasing the rubbed region and improving the orientation controlling force of the oriented film 5.

Accordingly, by improving the orientation controlling force of the oriented film 5, the AC residual image can be suppressed to conduct high-quality image display without display unevenness.

Moreover, with the same intensity of the electric field applied to the liquid crystal layer of a portion that contributes most to ON/OFF action of the display, the small film thickness of the oriented film 5 can decrease the intensity of the electric field applied to the interface of the oriented film. That is, by decreasing the intensity of the electric field applied to the interface of the oriented film, the AC residual image is suppressed.

Incidentally, it is advisable that the film thickness of the passivation film 4 is less than 0.5 mu m. However, when the film is too thin, it cannot protect the pixel electrode 3 and the like. When it is thick, the AC residual image is not reduced. Thus, it has to be in the range of from 0.1 to 0.7 mu m. Specifically, when the film thickness of the passivation film 4 and the residual extent (difference in brightness) of the AC residual image were comparatively examined, the AC residual image was less than 8% in case of the film thickness of 0.7 mu m, and the good image display was obtained.

Plasma CVD was used in the formation of this passivation film 4. This film formation took approximately 25 minutes.

A polyimide oriented film made of 2,2-bis[4-(p-aminophenoxy)phenylpropane] and pyromellitic acid dihydrate is used as the oriented film 5. Its film thickness is 50 nm.

With respect to the other material of the oriented film, as an amine to be copolymerized with tetracarboxylic acid dihydrate, represented by the following [formula 1], phenylenediamine, diphenylenediamine, triphenylenediamine, compounds represented by

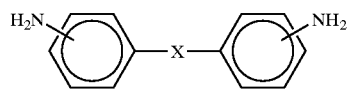

Formula 1

(wherein X represents a direct bond, —O—, —CH2-, —SO2-, —CO—, —CO2- or —CONH—), or compounds having structures represented by the following general [formulas 2]

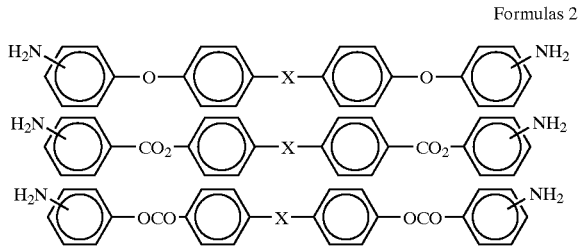

Formulas 2

(wherein X is a direct bond), such as a bis(aminophenoxy)diphenyl compound and the like are used.

Specific examples include p-phenylenediamine, m-phenylenediamine, 4,4'-diaminoterphenyl, 4,4'-diaminodiphenylsulfone, 3,3'-diaminodiphenylsulfone, 4,4'-diaminodiphenyl benzoate, 4,4'-diaminodiphenylmethane, 2,2'-(4,4'-diaminodiphenyl)propane, 4,4'-bis(p-aminophenoxy)diphenylsulfone, 4,4'-bis(m-aminophenoxy)diphenylsulfone, 4,4'-bis(p-aminophenoxy)diphenyl ether, 4,4'-bis(p-aminophenoxy)diphenylketone, 4,4'-bis(P-aminophenoxy)diphenylmethane and 2,2'-[4,4'-bis(p-aminophenoxy)diphenyl]propane.

Still further, there are 4,4'-diamino-3-carbamoyidiphenyl ether represented by the following [formula 3]

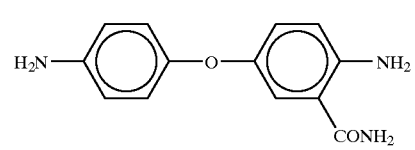

Formula 3 and diaminosiloxane compounds of the following [formulas 4].

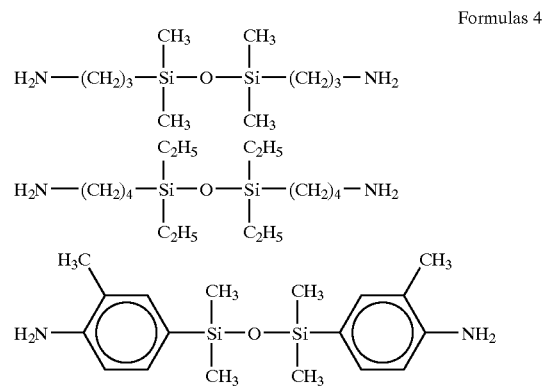

Formulas 4

Furthermore, examples of a halogen group-free diamine copolymerizable with the foregoing include 4,4'-diaminodiphenyl ether-3-carbonamide, 3-3'diaminodiphenylsulfone, 3-3'dimethyl-4-4'diaminodiphenyl ether, 1,6-diaminohexane, 2-2'-bis[4-(4-aminophenoxy)diphenyl]propane, 2-2'-bis [4-(4-aminophenoxy)phenyl]methane, 2-2'-bis[4-(4-aminophenoxy)phenyl]sulfone, 2-2'-bis[ 4-(4-aminophenoxy)phenyl]ketone, 2-2'-bis[4-(4-aminophenoxy)phenyl]biphenyl, 2-2'-bis[4-(4-aminophenoxy)phenyl]cyclohexane, 2-2'-bis[4-(4-aminophenoxy)phenyl]methylcyclohexane, bis[4-(4-aminobenzoyloxy)benzoic acid]propane, bis[4-(4-aminobenzoyloxy)benzoic acid]cyclohexane, bis[4-(4-aminobenzoyloxy)benzoic acid]methylcyclohexane, bis[4-(4-aminomethylbenzoyloxy)benzoic acid]propane, bis(4-aminobenzoyloxy)propane, bis(4-aminobenzoyloxy)methane, bis[2-(4-aminophenoxy)phenyl]methane, bis[2-(4-aminophenoxy)-3,5-dimethylphenyl]methane, bis[2-(4-aminophenoxy)-3,4,5-trimethylphenyl]methane, bis[2-(4-aminophenoxy)-3,5,6-trimethylphenyl]methane, bis[2-(4-aminophenoxy)-3,5-diethylphenyl]methane, bis[2-(4-aminophenoxy)-5-n-propylphenyl]methane, bis[2-(4-aminophenoxy)-5-isopropylphenyl]methane, bis[2-(4-aminophenoxy)-5-methyl-3-isopropylphenyl]methane, bis [2-(4-aminophenoxy)-5-n-butylphenyl]methane, bis[2-(4-aminophenoxy)-5-isobutylphenyl]methane, bis[2-(4-aminophenoxy)-3-methyl-5-t-butylphenyl]methane, bis[2-(4-aminophenoxy)-5-cyclohexylphenyl]methane, bis[2-(4-aminophenoxy)-3-methyl-5-cyclohexylphenyl]methane, bis

[2-(4-aminophenoxy)-5-methyl-3-cyclohexylphenyl]methane, bis[2-(4-aminophenoxy)-5-phenylphenyl]methane, bis[2-(4-aminophenoxy)-3-methyl-5-phenylphenyl]methane, 1,1-bis[2-(4-aminophenoxy)-5-methylphenyl]ethane, 1,1-bis[2-(4-aminophenoxy)-5-dimethylphenyl]ethane, 1,1-bis[2-(4-aminophenoxy)-5-methylphenyl]propane, 1,1-bis[2-(4-aminophenoxy)-3,5-dimethylphenyl]propane, 2,2-bis[2-(4-aminophenoxy)phenyl]propane, 2,2-bis[2-(4-aminophenoxy)-3,5-dimethylphenyl]propane, 1,1-bis[2-(4-aminophenoxy)-5-methylphenyl)butane, 2,2-bis[2-(4-aminophenoxy)-3,5-dimethylphenyl]butane, 1,1-bis[2-(4-aminophenoxy)-5-methylphenyl]-3-methylpropane, 1,1-bis[2-(4-aminophenoxy)- 3,5-dimethylphenyl]cyclohexane, 1,1-bis[2-(4-aminophenoxy)-5-methylphenyl]-3-3-5-trimethyl cyclohexane and the like, and further diaminosiloxanes. However, it is not limited to these.

Meanwhile, examples of the compound having the long-chain alkylene group as the acid component and other copolymerizable compounds can include octylsuccinic acid dianhydride, dodecylsuccinic acid dianhydride, octylmalonic acid dianhydride, decamethylenebistrimellitic acid dianhydride, decamethylenebistrimellitate dianhydride, 2,2-bis[4-(3,4-dicarboxyphenoxy)phenyl]octyltetracarboxylic acid dianhydride, 2,2-bis[4-(3,4-dicarboxybenzoyloxy)phenyl]tridecanetetracarboxylic acid dianhydride, 2,2-bis[4-(3, 4-dicarboxyphenoxy)phenyl]tridecanetetracarboxylic acid dianhydride, stearic acid, stearyl chloride, pyromellitic acid dianhydride, methylpyromellitic acid dianhydride, 3,3',4,4'-biphenyltetracarboxylic acid dianhydride, dimethylenetrimellitic acid anhydride, 3,3',4,4'-biscyclohexanetetracarboxylic acid dianhydride, 3,3',4,4'-benzophenonetetracarboxylic acid dianhydride, 3,3',4,4'-diphenylmethanetetracarboxylic acid dianhydride, 3,3',4,4'-diphenyl ether tetracarboxylic acid dianhydride, 3,3',4,4'-diphenylsulfonetetracarboxylic acid dianhydride, 2,3,6,7-naphthalenetetracarboxylic acid dianhydride, 3,3',4,4'-diphenylpropanetetracarboxylic acid dianhydride, 2,2-bis[4-(3,4-dicarboxyphenoxy)phenyl]propanetetracarboxylic acid dianhydride, 2,2-bis[4-(3,4-dicarboxyphenoxy)phenyl]hexafluoropropanetetracarboxylic acid dianhydride, 2,2-bis[4-(3,4-dicarboxybenzoyloxy)phenyl]propanetetracarboxylic acid dianhydride, cyclopentanetetracarboxylic acid dianhydride, 1,2,3,4-cyclobutanetetracarboxylic acid dianhydride, bicyclo(2,2,2)octa-7-en-2,3,5, 6-tetracarboxylic acid dianhydride, 1,2,3,4-cyclopentanetetracarboxylic acid dianhydride, 1,2,3,4-butanetetracarboxylic acid dianhydride and the like.

Moreover, the formation of the oriented film can easily be conducted by not only a printing method but also a wet method such as a spin coating method, a bar coating method or the like. However, when it is formed, like an ordinary oriented film, by the printing method, patterning or the like after the film formation is dispensed with, and a productivity in particular can be improved.

The presence or absence of the residual image formed by pure AC driving of the thus-formed liquid crystal display device can directly be judged by measuring whether or not the change in B-V characteristics (brightness-voltage characteristics) in the pure AC driving (change in initial brightness B and brightness B after retention for 30 minutes with half tone when white display is conducted and retained for 30 minutes to give the maximum brightness display in the usual driving and brightness-voltage characteristics are likewise measured) occurs. That is, when the B-V characteristics are changed, the B-V characteristics after display are different in two zones in which different displays are conducted respectively, and there is a difference in the B-V characteristics even when the same voltage is inputted, with the result that the difference in brightness occurs in the two zones and this is observed as a residual image.

FIG. 5 is a block diagram of a measurement system for evaluating change in B-V characteristics. Numeral 21 is a thermostat, 22 a monitoring window (glass window), 23 a digital multimeter, 24 a measurement controller, 25 a sample (liquid crystal display device), 26 a back light, 27 a common voltage power supply, 28 a signal voltage supply, and 29 a gate voltage power supply.

The liquid crystal display device 25 as the sample is measured after the temperature is stabilized for 4 or more hours along with the back light 26. The liquid crystal panel 25 is subjected to pure AC driving (AC driving) with a DC component being 0 at a common voltage of 0 V.

A gate of the liquid crystal display device 25 is subjected to DC driving, and 16 V is inputted into the gate. The common voltage was a fixed value of 0 V. An output from a brightness system is inputted into the measurement controller 24 by the digital multimeter as a brightness value.

And, the change of a B-V curve before and after the AC driving is measured in the following order (1) to (3).

(1) Brightness Bb (Vsig) is successively measured while a signal voltage Vsig is increased from 0 V.

(2) Driving is conducted for 30 minutes at a signal voltage Vmax at which brightness reaches a maximum.

(3) Brightness Ba (Vsig) is successively measured while a signal voltage Vsig is decreased from Vmax to 0 V.

Consequently, a brightness change value DELTA B (Vsig) before and after the pure AC driving "(1)" DELTA B (Vsig)(%)=[Ba(Vsig)−Bb(Vsig)]/Bb(Vsig) can be obtained.

Incidentally, the measurement was conducted at 55 DEG C. As a result, DELTA B(Vsig) was less than 8%, and the good display characteristics were obtained.

When a coating property of the substrate is improved by a method such as UV/ozone irradiation or the like in the formation of the oriented film, the oriented film is easily formed more uniformly throughout the surface to further improve coverage of electrodes. Further, when the passivation film is thin to a certain extent, the crack becomes large, and the coating property in the crack is easily improved by a method such as UV/ozone irradiation or the like to further improve coverage by the oriented film.

Next, second to tenth working examples of the invention are described by referring to Table 1.

TABLE 1

|  | Diamine component | Acid component | Weight average molecular weight* | AC residual image** |
|---|---|---|---|---|
| Example 2 | 2,2'-bis[4-(4-aminophenoxy)phenyl]biphenyl | octylsuccinic acid dianhydride | 12000 | <8% |
| Example 3 | bis[2-(4-aminophenoxy)-5-cyclohexylphenyl]methane | 2,2-bis[4-(3,4-dicarboxy-phenoxy)phenyl]octyltetra-carboxylic acid dianhydride | 7290 | <8% |

TABLE 1-continued

| | Diamine component | Acid component | Weight average molecular weight* | AC residual image** |
|---|---|---|---|---|
| Example 4 | 1,1-bis[2-(4-aminophenoxy)-3,5-dimethylphenyl]ethane | 3,3',4,4'-biscyclohexane-tetracarboxylic acid dianhydride | 3930 | <8% |
| Example 5 | 2,2-bis[2-(4-aminophenoxy)phenyl]propane | 2,3,6,7-naphthalenetetra-carboxylic acid dianhydride | 18530 | <8% |
| Example 6 | 1,1-bis[2-(4-aminophenoxy)-5-methylphenyl]butane | 2,2-bis[4-(3,4-dicarboxy-phenoxy)phenyl]propane-tetracarboxylic acid dianhydride | 19000 | <8% |
| Example 7 | 1,1-bis[2-(4-aminophenoxy)-3,5-dimethylphenyl]cyclohexane | 2,2-bis[4-(3,4-dicarboxy-benzoyloxy)phenyl]propane-tetracarboxylic acid dianhydride | 27000 | <8% |
| Example 8 | 1.1-bis[2-(4-aminophenoxy)-5-methylphenyl]-3,3,5-trimethylcyclohexa | cyclopentanetetracarboxylic acid dianhydride | 8510 | <8% |
| Example 9 | bis[4-(4-aminobenzoyl-oxy)benzoic acid]propa | 1,2,3,4-cyclobutanetetra-carboxylic acid dianhydride | 24180 | <8% |
| Example 10 | bis[2-(4-aminophenoxy)-5-n-propylphenyl]methane | 1,2,3,4-cyclopentanetetra-carboxylic acid dianhydride | 22390 | <8% |
| Comparative Example 1 | m-phenylenediamine | 1,5bis[4-(3,4-dicarboxybenzoyloxy)phenyl]-decafluoropentanetetra-carboxylic acid dianhydride + 1,2,3,4-butanetetra-carboxylic acid dianhydride | 4000 | 12% |

EXAMPLES 2 TO 10

Liquid crystal display devices were produced in the same manner as in Example 1 except for the following items, and were evaluated. That is, the film thickness of the oriented film is 0.3 mu m, and the time required for formation of the passivation film is approximately 15 minutes.

Even when the thus-produced liquid crystal display devices were subjected to half tone display at 55 DEG C. for 500 hours, no display defect occurred.

With respect to the liquid crystal display devices, the AC residual image was measured, and the results were as shown in [Table 1].

Further, [H] pattern was displayed for 30 minutes, and then subjected to black display. At this time, the residual image was visually observed at 0 to 40 DEG C. and 55 DEG C. The results are shown in [Table 2].

TABLE 2

| | AC residual image | Use temperature 0 to 40° C. | Use temperature 55° C. |
|---|---|---|---|
| Examples 1 to 10 | <8% | ○○ | ○○ |
| Comparative Example 2 | 8 to 12% | ○ | Δ |
| Comparative Example 1 | >12% | X | X |

Visual observation:
○○: No residual image is seen.
○: A residual image disappears within 3-minutes.
DELTA: A residual image disappears within 10 minutes.
X: A residual image is seen after 10 minutes.

From [Table 1] and [Table 2], it is found that when the AC residual image is 8 to 12%, the residual image disappears relatively quickly in the use temperature range, while when the AC residual image is less than 8%, the residual image does not occur either at the high temperature or in the use temperature range and the good display quality is maintained.

For comparing the effects in the above-mentioned Examples of the invention, Comparative Examples are described.

COMPARATIVE EXAMPLE 1

A liquid crystal display device was produced in the same manner as in (Example 1) except for the following matters, and was evaluated.

That is, 1.0 mol % of m-phenylenediamine was dissolved in N-methyl-2-pyrrolidone. To this was added 0.1 mol of 1,5bis[4-(3,4-dicarboxybenzoyloxy)phenyl]decafluoro-pentan etetracarboxylic acid dianhydride, and the reaction was conducted at 40 DEG C. for 2 hours to form an oligomer containing a fluoro group of a side chain type and having a weight average molecular weight of approximately 4,000 calculated as standard polystyrene. Further, 0.9 mol of 1,2,3,4-butanetetracarboxylic acid dianhydride was added, and the reaction was conducted at 20 DEG C. for 8 hours and at 130 DEG C. for 1 hour to obtain a polyoligomer amic acid imide varnish in which a ratio of a fluoro group-containing oligomer was approximately 10%. This varnish was diluted to a concentration of 6%, and gamma-aminopropyltriethoxysilane was added in an amount of 0.3% by weight as a solid content. Thereafter, printing formation was conducted, and heat treatment was conducted at 200 DEG C. for 30 minutes to form an oriented film of approximately 70 nm.

The thus-formed display device was measured in the same manner as mentioned above. Consequently, the AC residual image is more than 12%, and the residual image remains.

COMPARATIVE EXAMPLE 2

A liquid crystal display device was produced in the same manner as in (Example 1) except for the following matters.

That is, 3,4-dicarboxy-1,2,3,4-tetrahydro-1-naphthalene-succinic acid dianhydride, p-phenylenediamine and 1-hexadecanoxy2,4-diaminobenzene were reacted in N-methyl-2-pyrrolidone at room temperature for 10 hours to form a polyamic acid intermediate solution.

To this polyamic acid intermediate solution were added acetic acid anhydride and pyridine as an imidation catalyst, and the reaction was conducted at 50 DEG C. for 3 hours to form a polyimide resin. This varnish was diluted to a concentration of 6%, and printing formation was conducted. Heat treatment was conducted at 200 DEG C. for 30 minutes to form an oriented film of approximately 70 nm.

This was evaluated. Consequently, the AC residual image was 10%. The residual image slightly remained in the use temperature range. The residual image remained at the high temperature of 55 DEG C.

As described above, the use of the polyimide oriented film free from the side chain-type structure can suppress the AC residual image in the liquid crystal display device comprising a pair of substrates and a liquid crystal layer held between the pair of substrates, at least one of the pair of substrates being provided with plural electrodes for applying an electric field approximately parallel to the surface of the substrate to the liquid crystal layer, a protecting film formed for protecting at least one of the plural electrodes and oriented films formed on the protecting film or the electrodes, and can provide the high-quality image display without display unevenness.

What is claimed is:

1. A method of measuring an AC residual image in a display panel, comprising:
   a first step of stabilize a display panel;
   a second step of measuring a brightness $B_b$ ($V_{sig}$) of the display panel, while a signal voltage $V_{sig}$ applied thereto is increased;
   a third step of driving the display panel for a predetermined period with a predetermined signal voltage $V_{max}$;
   a fourth step of measuring a brightness $B_a$ ($V_{sig}$) of the display panel, while the signal voltage $V_{sig}$ applied thereto is decreased; and
   a fifth step of obtaining a value of AC residual image $\Delta B$ ($V_{sig}$) by the following formula:

$$\Delta B\ (V_{sig})\ (\%) = [B_a\ (V_{sig}) - B_b\ (V_{sig})]/B_b\ (V_{sig}).$$

2. A method according to claim 1, wherein the display panel is driven by pure AC driving at the third step.

3. A method according to claim 1, wherein the first and the third steps are conducted at 55° C.

4. A method according to claim 2, wherein the first and the third steps are conducted at 55° C.

5. A method of measuring an AC residual image in a display panel, comprising:
   a first step of stabilize a display panel;
   a second step of measuring a brightness $B_b$ ($V_{si}$) of the display panel at many signal voltages $V_{sig}$;
   a third step of driving the display panel for a predetermined period with a predetermined signal voltage $V_{max}$;
   a fourth step of measuring a brightness $B_a$ ($V_{sig}$) of the display panel at many signal voltages $V_{sig}$; and
   a fifth step of obtaining a value of the AC residual image by the following formula:

$$\Delta B\ (V_{sig})\ (\%) = [B_a\ (V_{sig}) - B_b\ (V_{sig})]/B_b\ (V_{sig}).$$

6. A method according to claim 5, wherein the display panel is driven by pure AC driving at the third step.

7. A method according to claim 5, wherein the first and the third steps are conducted at 55° C.

8. A method according to claim 6, wherein the first and the third steps are conducted at 55° C.

* * * * *